March 2, 1937.  R. P. LEWIS  2,072,117
CLUTCH MECHANISM
Filed Sept. 5, 1935   2 Sheets-Sheet 1
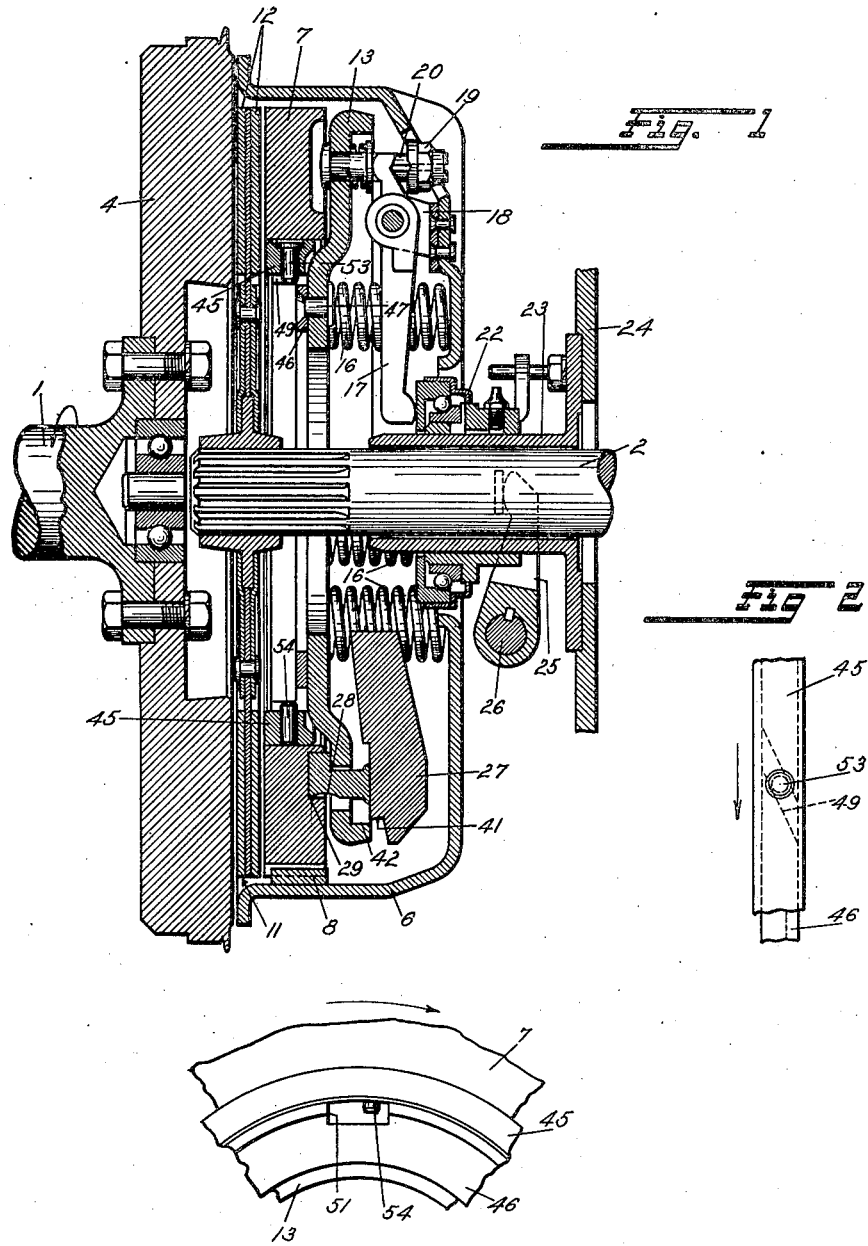
Inventor
Robert P. Lewis
By Strauch & Hoffman
Attorneys March 2, 1937.  R. P. LEWIS  2,072,117
CLUTCH MECHANISM
Filed Sept. 5, 1935   2 Sheets-Sheet 2

Inventor
Robert P. Lewis
By Strauch & Hoffman
Attorneys

Patented Mar. 2, 1937

2,072,117

UNITED STATES PATENT OFFICE 2,072,117

CLUTCH MECHANISM

Robert P. Lewis, Toledo, Ohio, assignor to Spicer Manufacturing Corporation, Toledo, Ohio, a corporation of Virginia Application September 5, 1935, Serial No. 39,327

9 Claims. (Cl. 192—105)

The present invention relates to mechanisms for transmitting power from a driving member to a driven member, and it is particularly concerned with improved mechanisms for picking up loads without shock, and although it is particularly useful in automatic clutches, it may be also advantageously employed in manually operable clutches.

In speed responsive clutches of the centrifugal type, for instance the clutch shown in Vail Patent No. 1,822,716, clutch engagement is normally solely dependent upon speed. It has been found that in certain commonly employed automotive drives, by reason of the nature of the transmission or free wheeling or other driven units, excessive lost motion or backlash exists between the driven clutch shaft and the vehicle wheels, with the result that if the vehicle is equipped with a centrifugal clutch, and the engine or other prime mover is suddenly accelerated the lost motion or backlash is almost instantaneously taken up and an objectionable noise commonly termed a "clunk" occurs.

In my copending application Serial No. 706,109, filed January 10, 1934, I have disclosed a mechanism which may be applied to centrifugal clutches and which efficiently takes up any lost motion in the driven assembly connected to an automatic or manual clutch, and it is a primary object of present invention to provide a mechanism having all of the desirable operating characteristics of the mechanisms shown in my aforesaid copending application, and to also generally refine and improve those constructions.

It is a further object of my invention to provide power transmitting mechanisms for use in clutches and the like, and which will respond to a predetermined acceleration and transmit torque between the driving and driven shafts, and yet which may be readily rendered inactive.

A further object is to devise a power transmitting mechanism which is responsive to acceleration to transmit torque between driving and driven members, and which is provided with resilient means for preventing the magnitude of the torque transmitted thereby from exceeding a predetermined value.

Further objects of my invention will become apparent as the specification proceeds in connection with the annexed drawings, and from the appended claims.

In the drawings:

Figure 1 is a longitudnal sectional view of an automatic clutch embodying the power transmitting mechanism of my invention and the parts are illustrated in automatic disengaged condition.

Figure 2 is a fragmental sectional view of the inertia ring assembly shown in Figure 1, and illustrates the cooperation of the actuating pins with the slots in the ring support.

Figure 3 is a fragmental sectional view of the inertia ring and its support, and illustrates one of the stop assemblies for limiting angular movements of the inertia ring.

Figure 6:
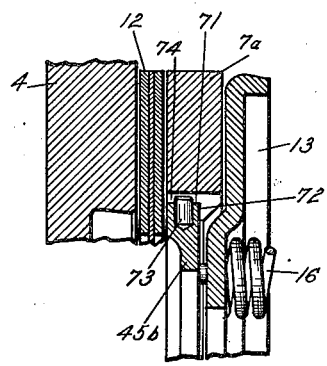
Figure 6 is a fragmental sectional view illustrating a further modified form of my invention.
Figure 8:
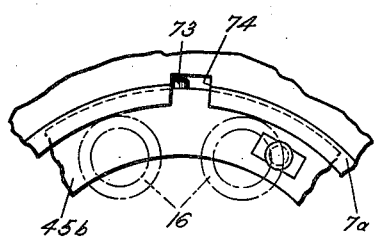

Figure 8 also is a fragmental sectional view of the modification of the invention shown in Figure 6 and it shows one of the stop pin assemblies.

With continued reference to the drawings, wherein like reference characters have been employed to designate like parts throughout the several views thereof, I have illustrated my invention as being applied to a centrifugally operable clutch, but it is to be understood that if desired it might be used with any other type of speed responsive or solely manual operable clutch without departing from the spirit of my invention.

With continued reference to Figure 1, the automatic clutch comprises a driving shaft 1, a driven shaft 2, a flywheel 4 to which is secured a cover 5 or housing 6, and a pressure plate 7, hereinafter termed the "automatic plate", is disposed within cover 6 and is mounted for synchronous rotation therewith by means of driving lugs 8.

A driven member, designated generally at 11, and having frictional facings 12 secured thereto, is splined to shaft 2 and is adapted to be frictionally gripped between plate 7 and the flywheel face. A reaction plate 13 is disposed adjacent plate 7 and they are urged toward each other by a plurality of holdback springs which act against plate 13 and bear against the heads of cap screws which extend through apertures in plate 13 and are threaded in plate 7 (not shown). Plates 7 and 13 are normally urged toward the flywheel by means of a plurality of compression springs 16, which act against plate 13 and react against cover 6.

The automatic and reaction plate assembly is adapted to be moved away from the flywheel against the action of springs 16 by means of a plurality of levers 17, carried on cover 6 by brackets 18, and their outer ends cooperate with nut and washer assemblies 19 carried by bolts 20. Bolts 20 are frictionally fitted into apertures in plate 13.

Levers 17 cooperate with a throwout assembly designated generally at 22, and which is mounted for sliding movement on a support 23 secured to a clutch housing 24 in any well known manner (not shown). Axial movement of throwout assembly 22 is effected by means of a fork 25, which is secured to a throwout shaft 26.

Plate 7 is actuated by means of a plurality of centrifugally operable weight members designated generally at 27, which have lever portions extending through apertures in plate 13 and carry offset portions 28, which are normally clamped between plate 13 and the bottom of recesses located in plate 7 by the holdback springs, when the prime mover associated with the driving shaft is operated at or below a predetermined idling speed. Weights 27 are adapted to rock outwardly about fulcrums 29 provided on offset portions 28, to thereby force plates 7 and 13 away from each other against the action of the holdback springs when driving shaft 1 is accelerated to speeds substantially in excess of idling speed.

The clutch just described is more fully disclosed in copending application Serial No. 676,567, filed June 19, 1933, and as the structural details thereof form no part of the present invention, it will not be further described other than to point out that shaft 26 is normally maintained in the position shown in Figure 1 by means of a latch or the like for holding the parts in automatic idling condition shown when the engine is operating at idling speed or is stopped. The latch may be released if desired to allow spring 16 to force the plates into engagement when the engine is stopped.

When the engine is accelerated with shaft 26 disposed in the latched position as shown in Figure 1, weights 27 rock outwardly about their fulcrums and bring the plates into engagement. Shaft 26 may be rocked in a counterclockwise direction, from the position shown in Figure 1 into disengaging position, so as to move reaction plate 13 to the right and carry plate 7 with it sufficiently far so that weights 27 are ineffective to engage the plates. Shaft 26 may be allowed to rock clockwise and allow springs 16 to engage the clutch even when the engine is stopped.

Mounted for limited rocking or limited rotative movement with respect to the driving and reaction plate assembly, and adapted to cooperate with the inner edge of the driven facing 12, is a comparatively narrow friction plate 45, which I will hereinafter term an "inertia ring", because it is responsive to acceleration-induced inertia forces to engage the driven member.

Ring 45 is slidably mounted on the periphery of a ring-like support 46, which is secured to reaction plate 13 by means of rivets 47 or the like. Ring 46 is provided with a plurality of actuating pin slots 49 and a plurality of stop pin slots 51. Slots 49 are inclined, and as shown in Figure 2 the slots assume a helix angle of approximately 65 degrees. A plurality of actuating pins 53 are secured in apertures in ring 45 in any suitable manner and cooperate with the walls of slots 49.

The driving walls of slots 51 are preferably square, or lie parallel to a plane containing the axis of the mechanism, and cooperate with a plurality of stop pins 54 which are secured in ring 45. Ring 45 is accordingly mounted for angular movement upon support 46 and its range of movement is determined by the width of stop pin slots 51. As ring 45 undergoes rocking movement, actuating pins 53 cooperate with the walls of slots 49 to advance the ring toward facing 12, or to retract toward the reaction plate, depending upon the accelerating forces and the direction of power transmission.

With the parts rotating at normal engine idling speed, in the direction indicated by the arrows in Figures 1, 2, and 3, the clutch is fully disengaged, as seen in Figure 1. When shaft 1 is given an acceleration of predetermined magnitude, ring 45, by virtue of its inertia, tends to remain at idling speed or "lags" behind plate 7, with the result that actuating pins 53 are forced into engagement with the walls of slot 49 and the reaction set up advances ring 45 toward the flywheel and into engagement with facing 12. Conversely, when shaft 1 and plates 7 are suddenly decelerated, the angular momentum of ring 45 opposes the decelerating action, and pins 53 cooperate with slots 49 and tend to retract the ring and restore it to the position illustrated in Figure 1.

When shaft 1 is accelerated as just described, and ring 45 is advanced into engagement with facing 12, the frictional coupling thus established tends to retard rotation of ring 45, and this reaction causes pins 53 to cam ring 45 with greater force toward facing 12, with the result that ring 45 undergoes a self-energizing or servo engaging action. As ring 45 is limited in its movement by stop pins 54, it can only advance a predetermined distance toward the flywheel under either the accelerating or servo actions.

With ring 45 engaged with facing 12 in response to the accelerating operation just described, a power transmitting connection of comparatively low torque capacity is established between shafts 1 and 2, and when shaft 1 attains a higher predetermined speed in excess of idling speed, weights 27 rock outwardly about their fulcrums 29 and force automatic plate 7 into engagement with facing 12. When plate 7 has been brought into firm engagement with facing 12 and has clamped the driven member between it and the flywheel, and weights 27 swing further outwardly in response to centrifugal force, reaction plate 13 moves to the right away from the flywheel, and hence actuation of the automatic plate does not in any way tend to cause ring 45 to exert further pressure upon facing 12. When shaft 1 reaches a predetermined higher speed, weights 27 rock out into their final position and bring their stop faces 41 into engagement with flange 42 of reaction plate 13. Thereafter further acceleration of driving shaft 1 is accordingly ineffective to build up further pressure in the clutch.

Assuming that the flywheel is operating at idling speed and the engine is only given a moderate acceleration, ring 45 will still manifest an inertia effect, but it will be of such small magnitude that it will not engage facing 12, and thereafter, if the engine is further accelerated, weights 27 will bring the plates into engagement as just described. Although, in this instance plate 7 is the only power transmitting medium, because of the low rate of acceleration, an acceleration of this character produces a "low torque" engagement of plate 7, and the backlash in the driven assembly is nevertheless taken up quietly and smoothly.

With the clutch fully engaged as just described, and the engine is decelerated, with the driven shaft tending to drive the driving shaft, as soon as facing 12 starts to slip with respect to plate 7 and ring 45, actuating pins 53 will cooperate with the other walls of slots 49 to exert a self-de-energizing effect upon ring 45 and bring it into disengagement. Ring 45 accordingly manifests no tendency to "drag" upon automatic disengagement of the clutch.

With the clutch fully engaged as just described, and it is desired to disengage the clutch, shaft 26 may be rocked anti-clockwise to move the throwout assembly to the left, and through levers 17, to move plate 13 to the right, and thereby carry plate 7 out of engagement with facing 12, notwithstanding the fact that weights 27 may remain in engagement with flange 41 of plate 13. Because of the stop pins provided on ring 45, the latter can not remain in a position where it will engage facing 12, and therefore the clutch may be cleanly disengaged without drag.

Figure 4:
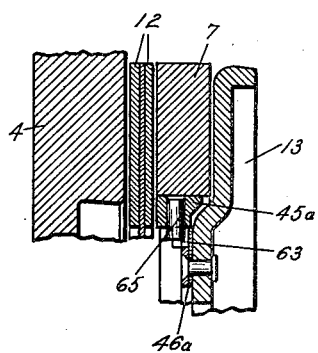
Figure 4 is a sectional view somewhat similar to Figure 1, illustrating a modified form of the invention.
Figure 5:
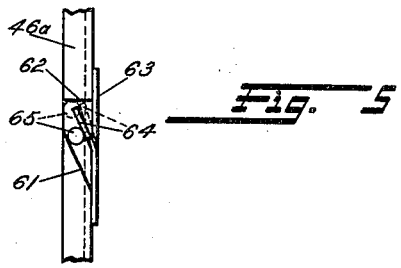
Figure 5 is a fragmental sectional view of the modification shown in Figure 4, and it illustrates one of the actuating pin assemblies.

Referring now to Figures 4 and 5, I have illustrated a modified form of my invention wherein the engaging forces applied to ring 45a in response to acceleration are limited to a predetermined magnitude by the use of springs. With continued reference to these figures, ring 45a is mounted for angular rocking movement on a support 46a in a manner similar to the ring of the first form of the invention. In this instance the support 46a is provided with a plurality of slots each having an inclined wall 61, and a wall 62 which is disposed normal to the face of the plate. Secured in position between the support 46a and reaction plate 13 are a plurality of spring members 63, having inclined resilient fingers 64, each of which provides a pin actuating face normally disposed substantially parallel to wall 61. A plurality of actuating pins 65, corresponding in number to the slots in support 46a, are secured in ring 45a and cooperate with walls 61 and springs 64, as indicated in Figure 5.

When driving shaft 1 is given a sudden acceleration, ring 45a manifests a tendency to remain stationary, as was the case in the first form of the invention and in this instance ring 45a causes pins 65 to react against spring fingers 64, and by reason of the inclination thereof, pins 65 are acted upon so as to advance ring 45 into engagement with facing 12 and take up the backlash in the manner previously described. Upon engagement of ring 45a with facing 12, a self-energizing action is set up as was the case in the previously described form of the invention, but in this case, the torque capacity of the resulting slipping coupling is much lower, because pins 65 promptly assume the position illustrated in dotted lines in Figure 5, and cause spring fingers 64 to deflect into the dotted line position. During the normal accelerating operation, ring 45a is accordingly urged into engagement with facing 12 under a yielding pressure exactly equal to the tension of fingers 64 in their dotted line position. The pressure can not exceed this value because wall 62 of the recess in support 46a is parallel to the direction of travel of the ring 45a and therefore can not apply engaging forces thereto. When the parts assume the dotted line position shown in Figure 5, further angular rocking movement of ring 45a is arrested by reason of engagement of pins 65 with walls 62, and therefore in this form of the invention it is not necessary to employ stop pin assemblies as the actuating pins perform their function.

With ring 45a advanced in the manner just described, further acceleration of shaft 1 is operable to bring plate 7 into engagement with facing 12 as previously described, and if it is desired to declutch, this may be effected by rocking shaft 26 in the manner described in connection with the first form of my invention. With the clutch fully engaged as just described, deceleration of the engine is operable to effect automatic disengagement of plate 7 and when this has occurred or the pressure has decreased to such a value that a slipping drive is established between facing 12 and ring 45a and plate 7, with the driven shawt tending to drive the driving shaft, actuating pins 65 are promptly restored to their full line position illustrated in Figure 5 and which results in prompt disengagement of ring 45a from facing 12. It is therefore seen that when the self-energizing engaging operation is effected a resilient means automatically limits the pressure build-up, whereas when the self-de-energizing operation is taking place, ring 45a is positively retracted by reason of the engagement of wall 61 with actuating pins 65. It is to be understood, however, that if desired wall 61 of support 46a may take the form of a spring or yielding wall, so as to effect a resilient retraction of ring 45a, without departing from the spirit of my invention.

Figure 7:
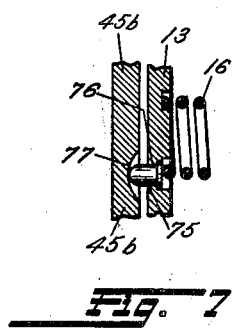
Figure 7 is a fragmental sectional view of the modification illustrated in Figure 6 and shows one of the actuating pin assemblies.

In Figures 6, 7, and 8 I have illustrated a further modification of my invention, and the major difference of this construction over that shown in Figures 4 and 5 resides in the use of a somewhat different means for establishing the resilient or yielding reaction for the acceleration-responsive ring.

With continued reference to these figures, driving plate 7a is provided with an annular groove 71, in which ring 45b is piloted. Ring 45b is also adapted to engage a circular face 72 of plate 7a under certain conditions. A plurality of pins 73 are mounted in ring 45b and extend into elongated recesses 74 in plate 7a, and accordingly limit the movement of ring 45b with respect to plate 7a to the degree indicated in Figure 8. Recesses 74 in the present instance have been formed in ring 45b by means of a milling cutter, and they accordingly have two inclined portions, one of which is inactive, as will presently appear.

Ring 45b is actuated in response to acceleration of shaft 1 by a plurality of shouldered pins 75, which are slidably mounted in apertures 76 in reaction plate 13, and extend into elongated curved recesses 77 in ring 45b. As seen in Figure 7, the heads of plungers 75 are flush with the bottoms of the seats in plate 13 for pressure springs 16, and each plunger is disposed under a spring, with the result that each plunger is normally held in the position shown in Figure 7 under a yielding pressure. Plungers 75 are preferably less in number than springs 16, with the result that ring 45b can never be engaged under the full pressure of springs 16 independently of plate 7a. In the present instance plungers 75 are three in number, while six springs 16 are used.

When driving shaft 1 is given an acceleration, ring 45b manifests a tendency to remain stationary and accordingly moves rearwardly with respect to plate 13 and curved walls of recesses 77 engage plungers 75 and cam ring 45b into engagement with facing 12. After engagement has been effected and the self-energizing action manifests itself, ring 45b is pulled rearwardly to its limit of movement with pins 73 in engagement with the other walls of slots 74. When this occurs, forces of considerable magnitude are applied to plungers 75 and they each move to the right as illustrated in Figure 7 against the action of pressure springs 16. This merely results in a tilting action being applied to springs 16 and hence their full pressure is not overcome. Therefore, the magnitude of the engaging forces upon ring 45b in this form of the invention are definitely limited by the pressure of the springs 16 with which each plunger cooperates.

With ring 45b engaged with facing 12 as just described, further acceleration of driving shaft 1 is effective to cause weights 27 to bring plate 7a into engagement with facing 12 and establish a non-slipping drive between the parts, as previously described, but in this instance face 72 of plate 7a engages ring 45b and causes the latter to engage facing 12 under the centrifugal action of weights 27. Therefore, when plate 7a is engaged with facing 12, ring 45b becomes a part of plate 7a and provides a supplemental clutch engaging area, and if desired the previously described forms of the invention may also be designed to function in this manner.

With the clutch fully engaged as just described, and shaft 1 is decelerated to the idling speed of the engine, as soon as the clutch pressure has decreased to such a value that slippage takes place between facing 12 and ring 45b and plate 7a, ring 45b will rock back into the position illustrated in Figure 7 with stop pins 73 disposed in engagement with the other walls of recesses 74. As seen in Figure 8, when ring 45b is disposed in retracted position, each plunger 75 is disposed in the bottom or in the mid-portion of the recess 77 and each stop pin 73 is disposed in engagement with a wall of recess 74. Therefore, ring 45b cannot rock in a direction to effect engagement when the driven shaft tends to overrun with respect to the driving shaft. In this instance plate 45b accordingly does not undergo a self-deenergizing action, and the normal tendency of the plates to separate is relied upon to disengage ring 45b from facing 12. However, if desired a light retracting spring assembly or the like may be provided for urging ring 45b toward engagement with its seat 72 on plate 7a, without departing from the spirit of my invention.

Although I have illustrated my invention as being applied to a single plate clutch, i. e. a clutch having a single driven member and two driving members, it will be understood that if desired it may be readily incorporated in clutches having two or more driven members and three or more driving members. Moreover the invention may be used in manually operable clutches and is therefore not to be understood as limited to use with the automatic clutch herein shown.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch, driving means, driven means, means for coupling said means, means for establishing a power transmitting connection between said driving and driven means independently of the operation of said coupling means when an acceleration of predetermined magnitude is imparted to said driving means, said last means being self-operable to augment its power transmitting action when said driving means tends to operate at a speed in excess of said driven means, and means for limiting the power transmitting operation of said last-named means.

2. The clutch described in claim 1, wherein said means for coupling said driving and driven means is applied to a friction clutch having a pressure plate, and wherein said means for establishing power transmitting connection between said driving and driven means comprises an auxiliary plate mounted for limited rotative movement with respect to said pressure plate.

3. In a power transmitting mechanism, a driving element, a driven element, means for establishing a driving connection between said elements, and means, comprising frictional parts, for transmitting power between said elements independently of the operation of said first-named means when one of said elements is given an acceleration of predetermined magnitude, said last-named means being operable to establish a yielding engagement pressure between said frictional parts.

4. In a clutch, a pressure plate mounted for rotation and having a frictional surface disposed substantially normal to its axis of rotation, an auxiliary plate operably associated with said pressure plate and having a frictional surface disposed substantially in the plane of the frictional surface of said pressure plate under certain predetermined conditions; means mounting said auxiliary plate for limited rotative movement with respect to said pressure plate; and means for causing said auxiliary plate to move axially of, and project beyond the frictional surface of said pressure plate when an acceleration of predetermined magnitude is imparted to said pressure plate.

5. In a clutch, a driven member providing a frictional surface, a pressure plate mounted for rotation and having a frictional surface disposed substantially normal to its axis of rotation and adapted to frictionally cooperate with said driven member; an auxiliary plate operably associated with said pressure plate and having a frictional surface disposed substantially in the plane of the frictional surface of said pressure plate under certain predetermined conditions, means for causing said auxiliary plate to move axially of and project beyond the frictional surface of said pressure plate and frictionally cooperate with said driven member when an acceleration of predetermined magnitude is imparted to said pressure plate, and means for establishing a resilient yielding engaging pressure between said auxiliary plate and said driven member when said auxiliary plate is projected.

6. The clutch described in claim 5, wherein said projecting means comprises cam portions provided on said auxiliary plate and which cooperate with yieldable cam faces.

7. In a clutch, a pressure plate mounted for movement into and out of engaging and disengaging cooperation with a driven member, an auxiliary plate mounted for limited rotative movement with respect to said pressure plate and adapted to frictionally cooperate with said driven member, and means for causing said auxiliary plate to move into frictional engagement with said driven member when said pressure plate is accelerated, comprising a plurality of cam pins projecting from said auxiliary plate, and each of which react against resilient inclined faces provided on a member which is angularly fixed with respect to said pressure plate.

8. In a friction clutch having a pressure plate and a plurality of compression springs urging it towards engaged position, an auxiliary plate mounted for limited rotative movement with respect to said pressure plate, a driven member, means for causing said auxiliary plate to move toward engaging position when an acceleration of predetermined magnitude is imparted to said pressure plate, comprising cam means provided on said auxiliary plate; and means for transmitting forces set up by said cam means to a part only of said compression springs, to establish a yielding engagement pressure between said driven member and said auxiliary plate when the latter undergoes engaging movement in response to acceleration.

9. The clutch described in claim 8, wherein said last-named means comprises a plurality of cam plungers against which said certain compression springs act.

ROBERT P. LEWIS.